Figure 1:
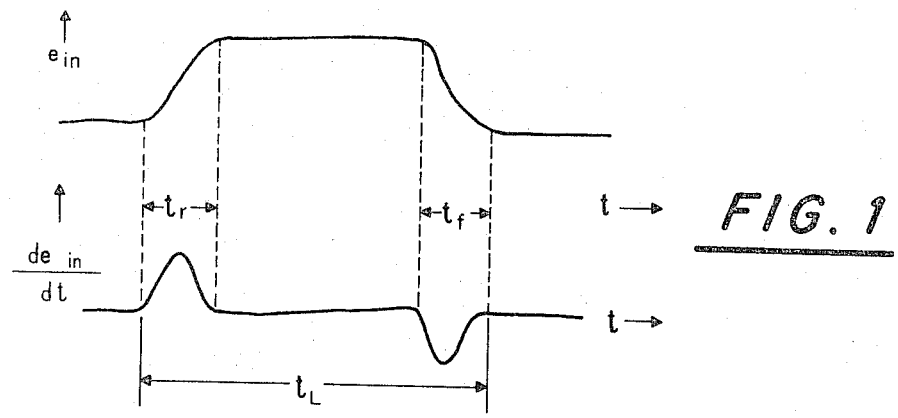

INVENTOR.
PHILIP G. SCHULS

INVENTOR.
PHILIP G. SCHULS

INVENTOR.
PHILIP G. SCHULS

United States Patent Office 3,317,828
Patented May 2, 1967

---

3,317,828
PULSE TIME MEASURING SYSTEM
Philip G. Schuls, Syracuse, N.Y., assignor, by mesne assignments, to the United States of America as represented by the Secretary of the Navy
Filed Jan. 22, 1964, Ser. No. 339,566
10 Claims. (Cl. 324—68)

The present invention relates to a pulse time measuring system and more particularly, to a pulse time measuring system for measuring rise time, pulse length and fall time of a pulse and specifically, to a pulse time measuring system which is applicable to typical sonar operation.

In the operation of sonar equipment and specifically when target classification is being done, it may be significant to have a measure of the waveform properties of the echo envelope received from the environment medium. Some of the waveform properties of interest are rise time, fall time and total pulse length. For example, a metallic object may cause an echo to have a faster rise time than say, a whale under the same condition. Different weights can be assigned to the pulse characteristics to designate their relative importance. Certainly no one characteristic, by itself, can classify the target but all of the waveform properties, together with other gathered information, may be very helpful in classifying the environment. Therefore, equipment to automatically measure the above mentioned waveform properties is needed.

Prior methods of measuring pulse time involved the use of oscilloscopes and actually observing the pulse envelope to observe the rise time, pulse length and fall time. Such a system requires storage devices and actually requires that an oscilloscope be utilized. It is also desirable when measuring the properties of a wave that the measuring be done in real time and that noise pulses which occur during the echo pulse be nullified.

An object of the present invention is to provide a pulse time measuring system which is practical and will automatically measure pulse parameters accurately.

A further object of the invention is to measure rise time, pulse length and fall time of a pulse accurately and automatically.

An additional object of the invention is to provide a system for measuring rise time, pulse length and fall time of a non-recurring pulse wherein the characteristics are measured and recorded.

A further object of the present invention is to provide a pulse time measuring system which tends to nullify the effect of random noise thereby increasing accuracy.

An additional object of the present invention is to provide a pulse time measuring system wherein the measurement is made in real time therefore obviating the need for a storage system.

A further object of the present invention is to provide a pulse time measuring system wherein the output is provided in digital form therefore obviating the need for any further decoding for utilization in the computer.

Another object of the present invention is to provide a pulse time measuring system which obviates the use of an oscilloscope.

Figure 2:
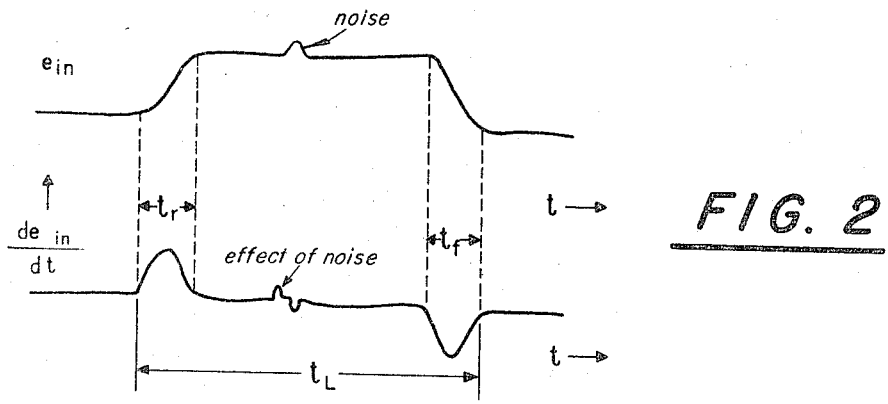
Figure 3:
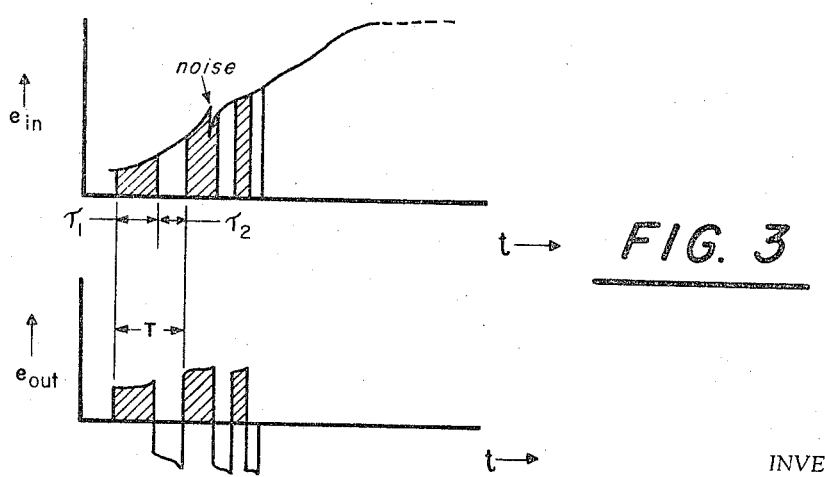
Figure 4:
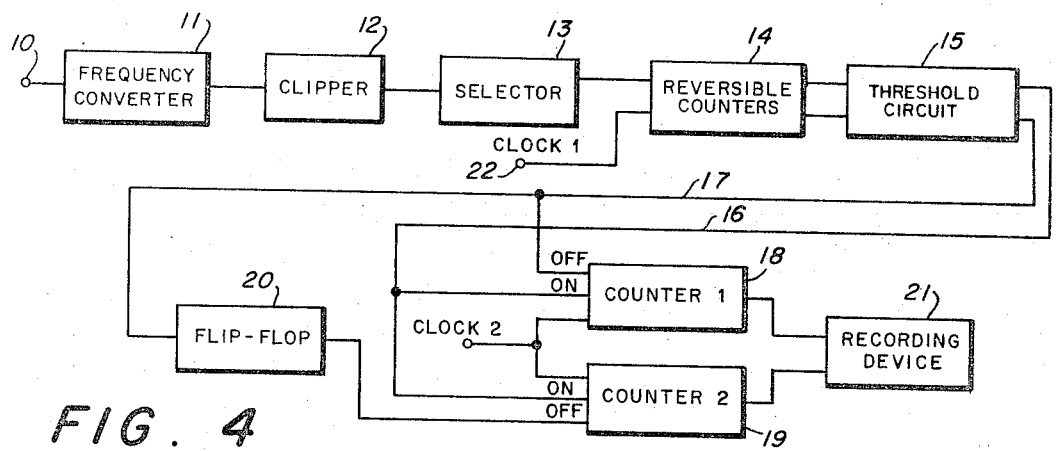
Figure 6:
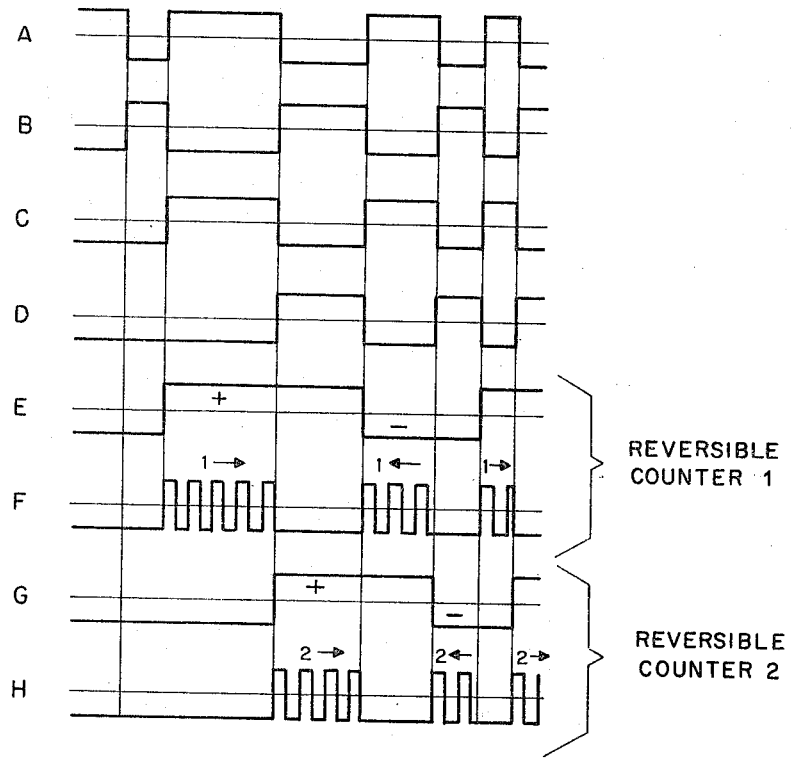
Figure 5:
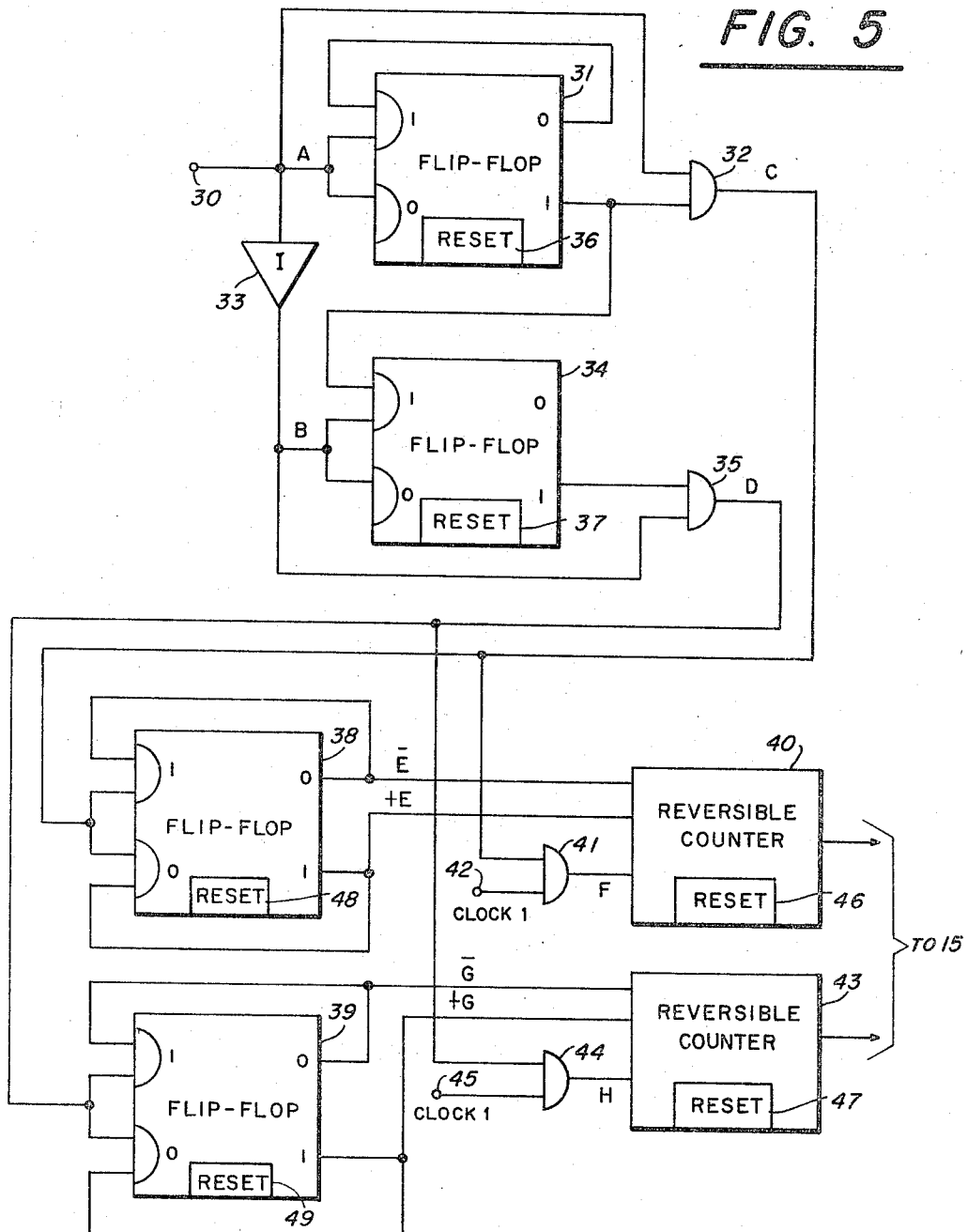

Other objects and many of the attendant advantages of this invention will be readily appreciated as the same becomes better understood by reference to the following detailed description when considered in connection with the accompanying drawings wherein:

FIG. 1 illustrates a differentiated signal;
FIG. 2 illustrates a differentiated signal and noise;
FIG. 3 is a waveform illustrating the basic converter operation;
FIG. 4 is a block diagram of an embodiment of the present invention;
FIG. 5 is a detailed showing of a portion of the block diagram of FIG. 4;
FIG. 6 is a diagram of waveforms at various points in the block diagram of FIG. 4.

The problem, basically, has been reduced to automatically measuring pulse times of a non-recurring pulse. The rise and fall times and the total pulse lengths of interest are on the order of milliseconds and longer. The present invention describes a non-oscilloscope method to measure non-periodic pulse times quite accurately. In addition, the pulse need only occur once for its characteristics to be measured and recorded. In addition, the technique described performs the measurement in real time and therefore obviates the need for any storage device.

At first glance, it would appear that if the received echo signal were differentiated, the resulting waveform would be of great value. Theoretically, there would be an output only during the rise and fall time of the input pulse. The theoretical waveform is illustrated in FIG. 1. However, if the input signals contain noise, as they will, the output will be drastically changed as differentiation is a noise-amplifying process. The presence of noise in the input causes the differentiated waveforms to be of little value as illustrated in FIG. 2 wherein the effect of noise is illustrated.

Therefore, noise is a very significant factor. Again theoretically, the problem can be attacked in two basic ways. That is, equipment may be designed to filter noise in either the frequency domain or the time domain. In the frequency domain, the filter is placed before the differentiator to eliminate noise whose frequency spectrum is different from the signal. One should then be able to interpret the differentiated waveform. In the time domain on the other hand, one can integrate the input signal as this would tend to average out random noise. Since the two methods are analagous, only the latter will be described in detail.

At this point reference is made to FIG. 4 which sets forth an embodiment of the present invention in block diagram. In the system the pulse is coupled in at input 10 to a voltage frequency converter 11. The voltage to frequency converter is a standard item and is described by Royer, G. H. in an article titled "Switching Transistor D.C. to A.C. Converter" published 1955 in the Transactions of the A.I.E.E., volume 74, part I, pages 322 through 324. The converter essentially integrates the input signal and in so doing performs a voltage-to-frequency conversion. The output from the converter 11 consists of discrete voltage pulses of fairly constant magnitude and of frequency varying with input voltage in the manner shown in FIGURE 3. The converter output signal $e_{out}$ is linearly proportional to the amplitude of the input voltage $e_{in}$, typically to an accuracy of not more than 2% error. Thus by measuring pulse frequency or, as is preferred, by measuring pulse durations $\tau_1$ and $\tau_2$ and comparing successive pulse durations one can determine if the amplitude of the input voltage is changing and in this way derive a measure of the input waveform. Note that noise tends to be cancelled out by the integrating action of the converter.

Assume that the input may vary from zero to ten volts. If zero volts corresponds to a converter frequency of oscillation of 20 kilocycles and ten volts corresponds to 100 kc. then the output pulses may be expected to vary from 50 microseconds to 10 microseconds in a total period or from 25 microseconds to 5 microseconds in half period. The present system, employing digital techniques, samples the half-periods of converter output to measure the input pulse parameters. The output of the voltage to frequency converter 11 is coupled to a clipper 12 whose output is coupled to a selector circuit 13 which selects adjacent positive and adjacent negative pulses. The output of selector 13 is coupled to a block 14 containing a pair of reversible counters, which has a clock input at 22. The output of the reversible counter block 14 is coupled to a thresholding circuit 15 which is adjusted to provide a thresholding level. This level is adjusted so that a change in magnitude of the input count from counters 14 from below to above a certain level results in an output from the thresholding circuit 15 and a change in magnitude of the input count from counters 14 from above to below a predetermined level results in another output from thresholding circuitry 15. The output appearing on line 16 will be referred to as an on-pulse while the output appearing on line 17 will be referred to as an off-pulse. Line 16 is coupled as one input to a counter 18 which is used to measure the rise time and fall time of the pulse coupled in at 10. Line 16 is also coupled as an input to a counter 19 which is utilized to measure the total pulse length of the input pulse. Line 17 is coupled as another input to counter 18 and constitutes the "off" input to the counter. Line 17 is also coupled through flip-flop 20 to the counter 19 as the "off" pulse to counter 19. The output of counter 18 is then coupled to a recording device as is the output of counter 19. The recording device 21 may be any conventional means for recording such as a magnetic tape, punch card, etc.

FIG. 5 illustrates the logic within the selector 13 and block 14. The output of clipper 12 is coupled in at 30 as the pulse input to a flip-flop 31. The input is coupled to both the "one" and "zero" side of the flip-flop 31 and also coupled as one input to an AND gate 32. The same input is also coupled through an inverter 33 as an input to a flip-flop 34 on the "one" and "zero" sides. The output of the inverter 33 is also coupled as one input to an AND gate 35. The "zero" output of flip-flop 31 is coupled back to the "one" input as an enable pulse while the "one" output from flip-flop 31 is coupled as the other input to AND gate 32 and also coupled as an enable input to the "one" side of the flip-flop 34. Contained within the flip-flops 31 and 34 are AND gates on the "one" and "zero" sides and also a reset circuit as at 36 and 37 respectively. The reset circuits 36 and 37 function to set the flip-flop to "zero" automatically after each measurement cycle.

The "one" output of flip-flop 34 is coupled as the other input to AND gate 35. The output of AND gate 32 is coupled as the pulse input to a flip-flop 38 on the "one" and "zero" sides while the output from AND gate 35 is coupled as the pulse input to a flip-flop 39 on the "one" and "zero" sides. Again, the flip-flops 38 and 39 have AND gates included within them on the "one" and "zero" input. The "zero" output of flip-flop 38 is coupled back to the "one" input as the enable pulse and also coupled to a reversible counter 40. The "one" output from flip-flop 38 is coupled back as an enable for the "zero" side and also coupled as an input to reversible counter 40. The other input to counter 40 comprises the output of an AND gate 41 which has an input from AND gate 32 and a clock input coupled in at 42.

The "zero" output of flip-flop 39 is coupled back as an enable pulse for the "one" input and also coupled as one input to reversible counter 43. The "one" output of flip-flop 39 is coupled back to the "zero" input and also coupled as an input to reversible counter 43. Another input to reversible counter 43 comprises the output of an AND gate 44 whose inputs comprise the output of AND gate 35 and a clock input coupled in at input 45. Reset circuits 48 and 49 are provided for resetting flip-flops 38 and 39 after each measurement cycle.

Successive positive pulse widths of FIG. 3 are subtracted from each other and successive negative pulse widths of FIG. 3 are subtracted from each other in the reversible counters 40 and 43, respectively. Subtraction is implemented by having the first positive pulse gate reversible counter 40 in a forward direction and the second positive pulse diminish the count. A similar sequence occurs in counter 43 for the negative pulses. In each counter the net difference between the forward and reverse counts indicates whether the input is rising or falling and provides a measure of its rate of rise or fall. After each difference count is completed and read out by one of the counters 40 and 43, that counter is reset by its reset circuit 46 or 47 to enable the next such count. For a 1 megacycle clock pulse at 42 and 45, and with 5 microsecond to 25 microsecond half-period pulses, numbers between 5 and 25 will be handled by the reversible counters 40 and 43.

The thresholding device 15 has a threshold which is set at some predetermined value of the count input from counters 40 and 43 and which thus corresponds to some predetermined minimum change in pulse length time. If the threshold is exceeded, counter 18 is gated on until successive differences as determined by reversible counters 14 no longer exceed the threshold; then counter 18 is turned off. By having a positive and negative threshold, rise and fall times can be determined in the counter 18. Counter 19 is on from the beginning of the rise time to the end of the fall time and thus gives the total pulse length. The threshold 15, in effect, acts as an on-off switch for counters 18 and 19. Note that the threshold also tends to nullify the effect of random noise.

The operation of the system will now be summarized with continuing reference to FIGURES 3–5 and with reference also to FIGURE 6 which illustrates representative waveforms at various points in the system. As previously explained, the input signal at 10 is converted by the voltage-to-frequency converter 11 to a series of pulses of alternating polarity and of frequency varying correspondingly to variations in voltage of the input signal, as illustrated in FIGURE 3. Since the converter output frequency thus provides a measure of input voltage, the input waveform may be derived from measurement of changes in converter output frequency or, as is actually done here, by measuring changes in the converter's output pulse length which of course is inversely related to its frequency. A difference in relative lengths of two adjacent pulses indicates a change in the input voltage, and the magnitude of the pulse length difference indicates the rate of the input voltage change.

To enable such pulse length comparisons, the converter output after clipping at 12 is connected through a selector 13, which sequentially selects pairs of adjacent pulses of like polarity for length comparison, to reversible counters 14 which measure any length differences between each two such selected pulses. The waveform at the input to selector 13, which is applied at terminal 30 in FIGURE 5, is waveform A of FIGURE 6. In operation, the waveform A of FIG. 6 will appear at input 30. The entire waveform is coupled as one input to AND gate 32 and also has a pulse input to the "one" and "zero" inputs of flip-flop 31. The flip-flop 31, through the use of the reset 36, is initially set to a "zero"; therefore the "one" side is enabled. As the first positive pulse hits the "one" input the flip-flop sets to a "one" output which enables the one side of flip-flop 34. The "one" output is also coupled to AND gate 32. After the complete measurement cycle reset 36 sets to a "zero" again so that the "one" input is again enabled.

At the same time, the waveform A is coupled to the flip-flop 31 it is also coupled to the input of inverter 33 and appears at the output as waveform B in FIG. 6. Waveform B is coupled to flip-flop 34 on the "zero" and "one" sides and due to the fact that there is an enable output at the "one" input there will be a "one" output from flip-flop 34 which is coupled to AND gate 35 which, in turn, is enabled by the output of inverter 33.

Therefore, waveforms C and D, at this point, will appear at the outputs of AND gates 32 and 35 respectively. These waveforms are coupled to flip-flops 38 and 39 respectively. Flip-flop 38 and flip-flop 39 function in exactly the same manner so only the operation of flip-flop 38 will be explained. Through the action of reset (48) flip-flop 38 is initially set to a "zero"; therefore, the "one" input of flip-flop 38 is enabled. The first positive pulse appearing at the input of flip-flop 38 sets the flip-flop 38 to a "one" output which starts counter 40 counting in a forward direction, at a rate determined by the clock input at 42, as indicated by a plus on the E line. Counter 40 will count as long as the duration of the output from AND gate 32 and will correspond to F in FIG. 6.

At the same time, the "one" output appearing on the E line also enables the "zero" input of flip-flop 38 so that the next succeeding positive pulse sets the flip-flop to a "zero" output which causes the reversible counter to count in the reverse direction as indicated by the minus sign on the $\overline{E}$ line. At the end of the second pulse the difference count standing in counter 40 is read out to the thresholding circuit 15, and the reset 46 then resets the reversible counter 40 to its original state.

Flip-flop 39 and reversible counter 43 function in exactly the same manner in regard to the negative pulses in the waveforms G and H as set forth in FIG. 6.

The outputs of the reversible counter 40 and reversible counter 43 are coupled to the thresholder 15, and each output will contain a negative number, zero, or a positive number. The threshold circuit 15 does not respond to difference counts transmitted to it by counters 40 and 43 which are below the threshold value. Whenever the magnitude of the difference count rises past a level such that it crosses the threshold, thus indicating a pulse length change representative of something more than noise or other random variation, the threshold circuit then produces an "on-pulse" which is transmitted to counters 18 and 19 by line 16, gating both counters on. As long as each successive difference count being transmitted to the threshold circuit 15 remains above the threshold value, thus indicating that the converter's output frequency still is changing and in turn indicating that its input voltage still is changing correspondingly, the counters 18 and 19 continue to run at clock 2 rate and continue to total counts indicative of rise time and pulse length, respectively, of the input voltage waveform.

As the input wave form approaches a voltage peak, the output of the voltage-to-frequency converter will begin to level off at some frequency corresponding to the magnitude of the peak voltage. At this point, successive pulses (both positive and negative) of waveforms C and D will approach equality of length and the difference counts out of reversible counters 40 and 43 will therefore approach zero. As the counts change in this direction, they will fall through the threshold value to which the threshold circuit 15 is set, and at the point of crossing the threshold circuit will generate an "off-pulse" on line 17.

This "off-pulse" is transmitted directly to the rise time counter 18 and gates it off. The count then standing in this counter gives the desired measure of rise time of the input waveform at terminal 10, and is transmitted to recording device 21 for later use as needed. This completes the measurement of rise time, and at this point a reset signal generated in any convenient manner and connected to the various resets previously mentioned operates to reset the flip-flops 31, 34, 38 and 39 to their initial states, to reset the reversible counters 40 and 43 to zero if they are not already at zero due to their being reset after each count, and to reset the rise and fall time counter 18 to zero.

The "off-pulse" on line 17 also is transmitted to flip-flop 20, enabling this flip-flop so that the next such "off-pulse" will be transmitted to counter 19. This first pulse is not itself transmitted, however, so counter 19 continues to run on thus accumulating a count indicative of the input pulse length.

Depending on its waveform, the input pulse at terminal 10 may hold near its peak or drop immediately as the pulse peak is passed, but in any event when the pulse trailing edge is reached and pulse voltage level starts changing back toward zero there will be a corresponding change in frequency out of the frequency converter 11. This frequency change results in pulse length differences such that magnitude of the difference counts out of the reversible counters 40 and 43 will rise above the threshold value to which the threshold circuit 15 is set, so an "on-signal" appears on line 16. The "on-signal" to counter 18 causes it to commence counting at clock 2 rate for fall time measurement, and this count will continue so long as the rate of frequency decrease is such that the threshold value is exceeded.

When the magnitude of this threshold value again is passed down through, the resulting "off-pulse" on line 17 stops the fall time counter 18 and the count then standing in it gives a measure of the fall time of the input voltage waveform. This "off-pulse" also is transmitted to counter 19 by flip-flop 20, which was enabled by the next preceding "off-pulse," stopping its count. The count then standing in counter 19 provides a measure of pulse length of the input waveform.

Counters 18 and 19 now are read out to the recording device 21, thus ending one complete measurement cycle. At this time the various resets previously described are energized in conventional manner to return all circuit elements, including counters 18 and 19, to their initial states preparatory to the measurement.

The present systems can measure rise time, pulse length and fall time of recurring and non-recurring pulses and the output is in digital form and therefore needs no further encoding before being treated in a computer or other digital system. In addition, the system averages out random noise thereby increasing accuracy and further, the measurement is made in real time so that no storage equipment is needed. Another advantage of the system is that no oscilloscope is needed to measure the pulse times involved.

Obviously many modifications and variations of the present invention are possible in the light of the above teachings. It is therefore to be understood that within the scope of the appended claims the invention may be practiced otherwise than as specifically described.

What is claimed is:

1. A pulse time measuring system for measuring rise time, fall time and overall pulse length comprising:
   a voltage to frequency converter for converting an input voltage pulse to an output comprising discrete voltage pulses;
   the frequency of said output changing in response to the amplitude of the input pulse;
   measuring means operatively coupled to said converter for measuring successive output pulse durations for determining if the amplitude of the input voltage is increasing, decreasing or remaining constant;
   rise and fall time measuring operatively coupled to the output of said measuring means for determining the rise and fall time of the input voltage pulse; and
   total pulse length measuring means operatively coupled to said measuring means for measuring the overall length of the input voltage pulse envelope.

2. A pulse time measuring system as set forth in claim 1 wherein:
   said measuring means comprise reversible counters, said counters operating to count in response to two successive pulses.

3. A pulse time measuring system as set forth in claim 1 and further including:
   threshold means operatively connected to the output of said measuring means and operating to produce an output corresponding to on-off in response to a predetermined measured input coupled to said threshold means;

said threshold means being operatively coupled to the input of said rise and fall time measuring means and said total pulse length measuring means.

4. A pulse time measuring system as set forth in claim 3 wherein:
said rise and fall time measuring means comprises another counter, said another counter operating to count as long as said threshold level is exceeded.

5. A pulse time measuring system as set forth in claim 4 wherein:
said total pulse length measuring means comprises further counter means, said further counting means being responsive to on-off pulses in the output of the threshold means;
said threshold means being operative to produce two on and two off pulses for each input voltage pulse at the input of the pulse time measuring system;
said further counter means being turned on by the first of said on pulses from said threshold means and being turned off by the second of said off pulses from said threshold means.

6. A pulse time measuring system for measuring rise time, fall time and overall pulse length of an input pulse comprising:
a voltage to frequency converter adapted for converting an input voltage pulse to an output comprising discrete voltage pulses;
said frequency of the discrete voltage pulses changing in response to the amplitude at the input to said voltage to frequency converter;
pulse selecting means operatively connected to the output of the voltage to frequency converter for selecting adjacent positive pulses and adjacent negative pulses;
measuring means operatively coupled to the output of said selecting means for measuring successive output pulse durations for determining if the amplitude of an input voltage is increasing and decreasing;
rise and fall time measuring means operatively coupled to said measuring means for determining the rise and fall time of a voltage input pulse;
total pulse length measuring means operatively coupled to said measuring means for measuring the overall length of the input voltage pulse envelope.

7. A pulse time measuring system as set forth in claim 6 wherein:
said measuring means comprises a pair of reversible counters;
one of said pair of reversible counters being operative to measure positive output pulse durations;
the other of said pair of reversible counters functioning to measure negative output pulse durations.

8. A pulse time measuring system as set forth in claim 6 and further including:
threshold means operatively coupled to the output of said reversible counters;
said threshold means being operative to produce an on output when the output of said reversible counter exceeds a predetermined threshold level;
said threshold means being operative to produce an off pulse when the output of the reversible counters falls below a predetermined threshold level;
the output from said threshold means being connected to said rise and fall time measuring means and said total pulse length measuring means.

9. A pulse time measuring system as set forth in claim 8 wherein:
said rise and fall time measuring means comprises a counter which is turned on when the output of said reversible counters exceeds the threshold level of said threshold means and turned off when the output from the reversible counters falls below a predetermined threshold level in said thresholding means.

10. A pulse time measuring system as set forth in claim 8 wherein:
said total pulse length measuring means comprises a further counter which is turned on when the output of the reversible counters exceeds a predetermined threshold level in said threshold means and is turned off when the output of the reversible counters falls below a predetermined threshold level in said thresholding means for the second time.

References Cited by the Examiner

UNITED STATES PATENTS 3,087,121  4/1963  Bell.
3,169,233  2/1965  Schwartz.

RUDOLPH V. ROLINEC, *Primary Examiner.*

WALTER L. CARLSON, *Examiner.*

P. F. WILLE, *Assistant Examiner.*